US006347709B1

(12) United States Patent
Biehl et al.

(10) Patent No.: US 6,347,709 B1
(45) Date of Patent: Feb. 19, 2002

(54) METHOD AND APPARATUS FOR TRANSFERRING PACKING UNITS

(75) Inventors: Johann Biehl, Linkenheim; Dieter Gaus, Bielefeld; Horst Kaplan, Oerlinghausen; Eugen Niessner, Bielefeld; Jörg Knüppel, Augustdorf, all of (DE)

(73) Assignee: Kloeckner Medipak GmbH, Schloss Holte-Stukenbrock (DE)

( * ) Notice: Subject to any disclaimer, the term of this patent is extended or adjusted under 35 U.S.C. 154(b) by 0 days.

(21) Appl. No.: 09/394,850

(22) Filed: Sep. 13, 1999

(30) Foreign Application Priority Data

Sep. 14, 1998 (DE) .......................................... 198 41 508

(51) Int. Cl.[7] ................................................ B07C 5/00
(52) U.S. Cl. ................ 209/552; 198/370.1; 198/370.12; 198/347.2; 198/432
(58) Field of Search ..................... 198/370.1, 370.12, 198/347.2, 471.1, 432; 209/552, 933, 936; 53/448, 247, 540

(56) References Cited

U.S. PATENT DOCUMENTS 3,876,057 A * 4/1975 Jones ....................... 198/347.2
4,874,076 A * 10/1989 Kaplan et al. .......... 198/370.12

FOREIGN PATENT DOCUMENTS

DE 36 17 259 A1 11/1987 ...................... 35/4
EP 0 806 361 A1 11/1997 .................... 57/14

* cited by examiner

Primary Examiner—Joseph E. Valenza
(74) Attorney, Agent, or Firm—Womble Carlyle Sandridge & Rice (57) ABSTRACT

A method of transferring packing units from a receiving station to a stack building station includes the steps of delivering the packing units to the receiving station in a plurality of rows and in a plurality of tracks in a conveying direction, accepting the packing units in a plurality of rows and in a plurality of tracks at a transfer apparatus, removing all packing units of desired properties from a first row not only including packing units of desired properties, storing the at least one packing unit of desired properties, and positioning the at least one stored packing unit of desired properties in a row following the first row, so that only rows of packing units of desired properties are collected at the stack building station. A transfer apparatus (1) for transferring packing units (3) according to the novel method includes a receiving station (4), a conveying device (2), a detecting device (34), a storing station (10) including at least one storing location (11) and being designed and arranged to store at least one packing unit (3) of desired properties and to feed the at least one stored packing unit (3) of desired properties into an empty space of one of the tracks to from a complete row, an observing device (35), a processor (36), a control device (37), and a stack building station (6).

9 Claims, 3 Drawing Sheets

METHOD AND APPARATUS FOR TRANSFERRING PACKING UNITS

CROSS REFERENCE TO RELATED APPLICATIONS

This application claims the benefit under 35 U.S.C. §119 of co-pending German patent application number 198 41 508.7 entitled "Verfahren zur Übergabe von einzelnen Packstücken von einer Abnahmestelle an eine Stapelbildungsstelle sowie Vorrichtung zur Durchführung des Verfahrens", filed on Sep. 14, 1998.

FIELD OF THE INVENTION

The present invention generally relates to a method of transferring packing units from a receiving station to a stack building station. The invention also relates to a transfer apparatus for transferring packing units in a plurality of rows and in a plurality of tracks.

The method and the apparatus may be especially used to convey packing units in the form of blisters being filled with tablets from a press at the end of a thermoforming machine as receiving station to a stack building station being arranged at the entrance of a cartoning machine.

BACKGROUND OF THE INVENTION

A one track method and a corresponding one track apparatus are known from the German Patent Application No. DE 36 17 259 A1. The end of a first packing machine serves as receiving station, and the entrance of a second packing machine serves as stack building station. A conveying device including rotors is arranged between the two packing machines, the rotors including three or four arms being movable in a clocked manner. The arms include suction elements, gripping elements or the like, and they each take over one packing unit at the receiving station. They pass the packing unit to the other rotors until the packing unit is inserted into the stack unit of the second packing machine at the stack building station. The two packing machines work at the same cycle, so that both packing machines simutaneously fulfil one cycle no matter whether or not a packing unit of desired properties is passed on. The packing system includes a device with which it is possible to remove undesired packages and to insert a desired package in the stream of material in the empty space. For this reason, an extra supply unit is allocated to the last rotor of the conveying device. At the beginning of a working cycle, a plurality of packages of desired properties is inserted into the extra supply unit, and the packages are stored therein. The extra supply unit can be automatically filled up to a predetermined minimum number of packing units of desired properties. During the operation of the system, the extra supply unit is filled up as soon as the predetermined minimum number of packing units is not reached any more. Although the transfer apparatus has a one track design, a relatively great minimum number of packing units of desired properties have to be stored in the extra supply unit. Usually, the packing units of desired properties to be stored first in the extra supply unit remain stored until the end of the packing cycle. When the extra supply unit is being filled, the second packing machine keeps on processing in a clocked manner, so that gaps may occur at the stack building station of the second packing machine.

A method and an apparatus for transferring packing units in a plurality of rows and in a plurality of tracks are known from the Otto Haensel GmbH leaflet "High-Performance Thermoforming Line CP-12 And P-4", printed May 1987. The receiving station, the conveying device and at least the stack building unit of the following machine have a two track design, so that under normal conditions two packing units run through the system side by side in a clocked manner, and two packing units simultaneously arrive at the stack building unit, and they are collected side by side. The number of packing units in the two stacks usually increases uniformly. In case of an empty space in the region of one of the two tracks, there is a cycle in which only one packing unit is passed on to the stack building unit. Consequently, the number of packing units in one of the stacks is increased by one, whereas the number of packing units in the other stack remains unchanged. It is especially undesired to achieve stacks of different heights since this does not allow for the desired clocked processing of the stacks in the following machine. With this known apparatus, it is possible to remove packing units of undesired properties. Nevertheless, the object to achieve stacks of packing units of same height at the stack building station cannot be attained. To solve this problem, it is known from the above mentioned leaflet to allocate one extra supply unit for each track to the rotor of the conveying device. The extra supply units may be prefilled with packing units of desired properties to later fill empty spaces. The packing units of desired properties to compensate empty spaces remain in the extra supply unit for a rather long period of time until an empty space occurs. Thus, during this long period of time in which the packing units are stored in the extra supply unit, the properties of the packing units may change with respect to the other packing units of desired properties being conveyed through the system. For example, the deflection of the packages may change or packing units coming from other producing processes may have other properties. Thus, it is difficult to insert die packing units of different properties into one single carton. A change of charges or a change of format also makes it difficult to combine the packing units of different properties in one stack. The extra supply units only fulfil their function if a predetermined number of stored packing units is located in the extra supply unit.

From the European Patent Application No. EP 0 806 361 A1 an apparatus for depositing pairs of packing units in a carton is known. The packing units, for example bags being filled with potato chips and being sealed, are produced in one track, and they are partitioned in an non-described fashion to two tracks by a conveying device. At the same time, packing units of undesired properties are determined and removed. Empty spaces in the two tracks are prevented. Packing units of undesired properties are not replaced by stored packing units, but following packing units of desired properties are inserted in the empty space of the packing unit of undesired properties. The packing units of desired properties in the two tracks are banked, and they are further conveyed when a certain number of packing units is present in front of the bank position. In this way, two packing units of desired properties are inserted in one single common carton.

SUMMARY OF THE INVENTION

Briefly described, the present invention provides a method of transferring packing units from a receiving station to a stack building station, the method including the steps of delivering the packing units to the receiving station in a plurality of rows and in a plurality of tracks, accepting the packing units in a plurality of rows and in a plurality of tracks at a transfer apparatus, removing all packing units of desired properties from a first row not only including packing units of desired properties, storing the at least one packing unit of desired properties; and positioning the at least one stored packing unit of desired properties in a row following to the first row, so that only rows of packing units of desired properties are collected at the stack building station.

The present invention is generally based on the idea to convey the packing units arriving at the receiving station in a plurality of tracks and in a plurality of rows further on to a transfer apparatus still in a plurality of rows and in a plurality of tracks. The packing units may be observed at the receiving station, or in the region where the packing units are conveyed through the transfer apparatus to detect an empty space. Such an empty space may either be an empty blister or a blister of other undesired properties. For example, the blister may not be completely filled with the material. In all these cases, it is about a packing unit of undesired properties that has already been removed, or that will be removed. It is clear that a packing unit of undesired properties has to be removed before it may reach the stack building station. Usually, if there is a packing unit of undesired properties in one track, there is going to be a packing unit of desired properties in the other track of the same row. The packing unit of desired properties is then stored or buffered in the conveying path of the transfer apparatus. When the storing location is empty, the packing unit of desired properties is stored for a relatively short limited period of time. If the storing location is already occupied by another packing unit of desired properties, the stored packing unit may be used to fill the empty space where the packing unit of undesired properties was formerly located. The stored packing unit is only used to fill an empty space if a complete row of packing units of desired properties is formed therewith. In this way, either completely filled rows of packing units of desired properties are collected at the stack building station, or an empty row of packing units arrive at the stack building station, i.e. the transfer apparatus effects an empty transport at that time. Consequently, it is ensured that uniformly and evenly growing stacks of packing units of desired properties are attained for further processing.

The present invention is applicable to all cases in which packing units arrive at the receiving station in a plurality of tracks and in a plurality of rows, wherein a theoretical line connecting a first packing unit of a first row and a first track and a second packing unit of a second row of the same first track extends parallel to the main direction of movement of the packing units. The invention can be easily understood in case it is applied to two tracks of packing units. Thus, two adjacent tracks are arranged to work in a clocked manner. Each row of packing units includes only two packing units, and there are only three different undesired statuses. As an unusual status, there is either an empty space in one row of packing units in the first track, in the second track or in both tracks. The fourth possible case, which is the normal and the desired case, two packing units of desired properties are arranged in the two adjacent tracks in one and the same row. In this fourth case, there is no problem to be solved. The two packing units of desired properties are conveyed parallel to one another by the transfer apparatus, and each of them arrives at a stack at the stack building station. In case there is an empty space in only one of the two tracks, it is requested whether or not the storing location of the storing station is occupied by a packing unit of desired properties. In case the location is already occupied, the stored packing unit of desired properties is fed into the conveying stream, so that a row consisting of two packing units of desired properties is attained, and it can be further processed. Therefore, the storing location may have to change its position from one track to the other track. If the storing location of the storing station is empty, the packing unit of desired properties of the row is collected in the storing location, and a completely empty row arrives at the transfer apparatus, the transfer apparatus carrying out an empty stroke with respect to the stack building station. In the third possible error situation, meaning a complete row of two packing units of undesired properties arriving, these two packing units are removed, and the transfer apparatus also carries out an empty stroke with respect to the stack building station. In this case, the storing station is not actuated, and it remains in position.

The method according to the present invention provides a number of advantages: Due to stacks having the same height building up, and the full height of the stacks being achieved at the same time, complete stacks are always attained at the stack building station. The stack filling process is completed at the same time for all stacks, so that it is especially easy to further process the stacks. The plurality of stacks can either be handled simultaneously, it may be arranged to form a row, or it may be processed in another way, for example, the stacks may be inserted into a carton. The method according to the present invention further eliminates a bottleneck limiting the capacity of the entire machine and the entire system, respectively. The method and the transfer apparatus may be used in a deep drawing packaging machine with which especially tablets are packaged, and blister packages are produced, filled, covered, punched, stapled and moved as a stack into a carton. It is clear that such a deep drawing package machine may include additional special steps which are not described herein since they are of no special interest to the present invention, and they are known to a person with skill in the art. The application of the new method has the effect that portions of the deep drawing package machine may run at a comparatively low speed, as it is desired or even required for a certain processing step. This is possible although the entire capacity of the system is great. An essential advantage of the novel method is that the packing units are only stored for a relatively short period of time, and that the number of stored packing units of desired properties is very low. In case of a two track design of the conveying system, the maximum number of packages to be stored at a time is one. Additionally, another package of desired properties is stored when the first stored package has been inserted into the conveying stream. Thus, the danger of negative shrinkage effects at a packing unit is prevented. It is further essential that each packing unit of desired properties is guided and held during the conveying motion through the transfer apparatus at each time. There is no position in which is packing unit of desired properties is subject to gravity only. This means that the conveying and working velocity may be increased, and that the packing units of desired properties are safely and securely conveyed. The method according to the present invention already provides advantages in case of a two track system. But it is also possible to apply the present invention to systems having more than two tracks.

In case of at least two empty spaces or at least two spaces not including packing units of desired properties in one of the tracks, the stored packing unit of desired properties is moved from the track including the first empty space in a direction transverse to the conveying direction of the packing units, so that it is moved to the other track, and it is inserted into the track including the second empty space to form a completely filled row. This is true in case that two empty spaces occur right beside one another, as well as in case completely filled rows are located between the two empty spaces in one common track. In these cases, it is necessary to realize a change of tracks with the stored packing unit of desired properties, since the packing unit is needed in the other track to form a complete row. This is immediately true for a two track process. In case there are more than two tracks, substeps have to be carried out. The kind of the substep to be carried out depends on whether an empty row or a complete row of packing units of desired properties is to be realized.

In case of a two track design and the receiving station receiving two tracks of packing units, only one packing unit of desired properties is stored for a limited time, and it is immediately used to fill a following empty space and to build a complete row consisting of two packing units. Thus, the period of time in which a packing unit is stored only lasts until a following empty space occurs, no matter in which one of the two tracks. The storing location of the storing station only has two different conditions. A packing unit of desired properties is either located and stored in the storing location, or the storing location is empty. Such a storing location is substantially different from a supply or stock unit in which a majority of packing units of desired properties is stored, the packing units remaining in the stack unit for varying periods of time. According to the present invention, the period of time during which the packing units are located in the packing location is relatively short. It depends on how often empty spaces occur that have to be filled. For example, the novel method may be used with a two track operation in case only one of the tracks is filled with packing units of desired properties and the other track is completely empty. In this case, the storing station also works from cycle to cycle and a working cycle and an empty cycle occur alternatingly at the stack building station.

In case of an at least three track supply of packing units at the receiving station, one or more packing units of desired properties are to be stored. In case of occurring empty spaces, the packing unit of desired properties or the packing units of desired properties are either used to fill the empty space, and they are fed into the stream of material to form a complete row consisting of a plurality of packing units, or, in case it is not possible to complete the row, an empty row is formed, and the packing unit of desired properties or the packing units of desired properties are stored to be used later. In case of such a three track supply, the number and the position of possible empty spaces is increased. There is a total number of seven error situations depending on whether it is possible to achieve a complete row, or if an empty row has to be produced. There are different steps to be carried out. It is easy to understand that in case of a three track design and operation, there is a maximum of two packing units of desired properties to be stored at a time. It is generally true that the maximum number of packing units of desired properties to be stored is less than the number of tracks by one. The necessary change of tracks has to be chosen to enable each storing location to fulfil the change of tracks to reach each and every track.

The transfer apparatus generally including a conveying device and corresponding stations also provides the advantages which have been already described with respect to the novel method. There is an additional aspect of the storing station having a rather simple structure since the number of packing units of desired properties to be stored at a time is advantageously low. The storing station also provides the possibility of guiding and holding the packing units, so that they are never subject to gravity only. Thus, the reliability of the conveying process is increased. The conveying device preferably includes at least one rotor including one or more arms. Suction elements, gripping elements or similar elements are arranged at the free ends of the arms to grip packing units, to hold them, to guide them and to convey them. Such a conveying device has a substantially shorter length than, for example, a conveyor belt on which packing units are moved in cases. The short length of the conveying device also has the effect that the entire transfer apparatus is substantially shorter and more compact than it is known in the prior art. There is a plurality of possibilities of realizing the transfer apparatus, for example, with respect to how the conveying device is designed. It makes sense to use at least one rotor. The rotor may include a number of arms being used more or less at the same time during following steps in the process, and with which a number of stations can be passed through. The general design of the conveying device and the number of tracks do not depend on one another. It is clear that the conveying device has to include suction elements, gripping elements or similar elements for each track. There is a certain relationship between the number of arms of the conveying device and the number of stations to be passed. A preferred embodiment includes a rotor having three arms as conveying device, the rotor being movable to work at four different stations. Generally, there may be an additional free station or an extra station allowing for a manual insertion of packing units of desired properties into the flow of material. In case this extra supply unit is arranged in front of the storing station as seen in the conveying direction, there only has to be one single extra supply unit, no matter how many tracks the system includes.

It is generally true that the number of storing locations of the storing station is less than the number of tracks transverse to the conveying direction by 1. Thus, the lowest possible number of storing locations has to be provided, and the lowest possible number of packing units of desired properties has to be stored.

In a preferred embodiment of the system, the rotor of the conveying device includes at least three arms being equally spaced apart about the circumference of the rotor. There is a plurality of tracks. During rotation of the rotor, each arm gets in contact with the receiving station, the storing station and the stack building station. But it is also possible to vary the number of arms at the rotor. There is also a great number of possibilities of designing the gear and the transmission of the rotor.

The control device to control the movements of the storing station, the conveying device and the stack building station is designed and arranged to control the conveying device and the stack building station to either produce a completely row of packing units in each cycle of the conveying device, or not to pass on any packing units at all. If no packing units are passed on, the control device suppresses the activation of the next cycle of the stack building station. The receiving station on the one hand, and the stack building station on the other hand, are not connected by a common working or processing cycle, as this is known from the prior art, but instead, they substantially work independently. When no packing units are passed on, the cycle of the stack building station and of all following parts in the system is suppressed.

It is possible to use an extra supply unit to manually insert packing units of desired properties into the flow of material. Such an extra supply unit serves to reinsert packing units of desired properties. There only has to be one single extra supply unit no matter how many tracks of packing units are present since the extra supply unit works together with the storing station, and it may thus reach all tracks.

The detecting device to detect a packing unit of undesired properties or to detect an empty space in the plurality of tracks may watch a plurality of functions. The empty packages or the packages of undesired properties may be removed from the flow of material before they reach the receiving station, but also after they have passed the receiving station, meaning in the region of the conveying device. An ejecting device to eject empty packages and packages of undesired properties may be allocated to the conveying device. Such an ejecting station may be also arranged in the region of the rotor. Then, it is only necessary to correspondingly control the gripping elements or the suction elements. The ejection or removal of the packages of undesired properties may occur during the conveying movement from one station to another station, meaning in a middle position between two stations, for example between the receiving station and the storing station. It is also possible to separate empty packages and packages of undesired properties, for example to reuse tablets being located inside packages of undesired properties, and to reinsert the tablets into the packing operation.

Other objects, features and advantages of the present invention will become apparent to one with skill in the art upon examination of the following drawings and the detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
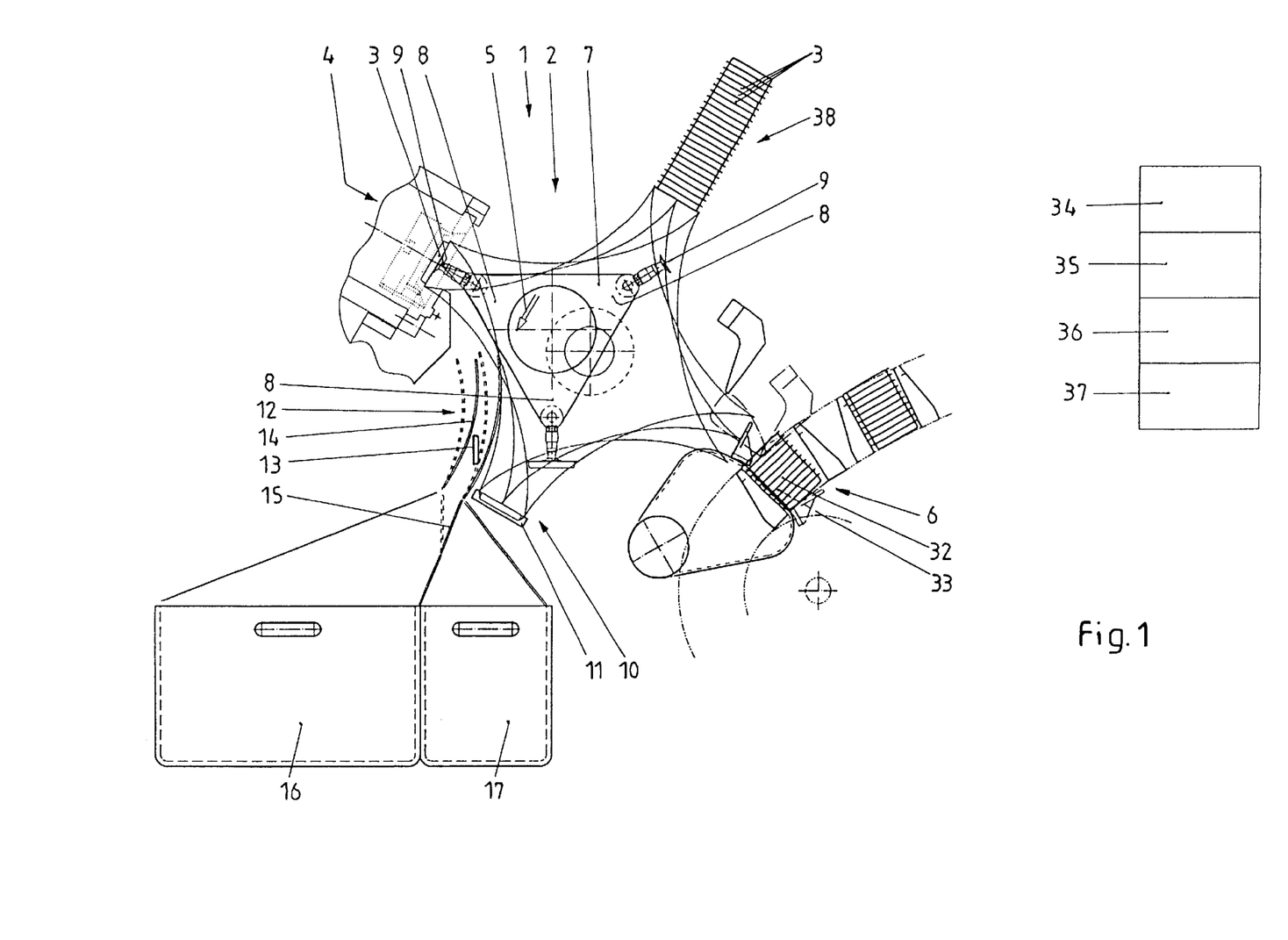
FIG. 1 illustrates a side view of a transfer apparatus including a conveying device.

Referring now in greater detail to the drawings, FIG. 1 schematically illustrates the essential elements of a transfer apparatus 1 in a side elevational view. The transfer apparatus 1 includes a conveying device 2 serving to transport and to convey packing units 3. The packing units 3 arrive at a receiving station 4, and they are conveyed by the conveying device 2 in a conveying direction 5 being indicated by an arrow. They are further conveyed to a stack building station 6. The conveying device 2 includes a rotor 7 having an approximately triangular shape, the rotor 7 at each of its three edges including an arm 8. Each arm 8 includes a suction element 9 serving to transport and to release the packing units 3. It is also possible to use other transporting or gripping elements instead of the suction elements 9. The type of transporting elements is chosen with respect to the kind of the packing units 3 to be transported, and with respect to the possibility of gripping, transporting and releasing the packing units 3. Along the circumference of the rotor 7 and of the conveying device 2, not only the receiving station 4 and the stack building station 6, but additionally a storing station 10 is provided. The storing station 10 is arranged between the receiving station 4 and the stack building station 6 in the conveying direction 5. The storing station 10 in its simplest embodiment includes a case forming a storing location 11. In the simplest embodiment, one single packing unit 3 of desired properties can be received in the case to be stored for a limited period of time. An ejecting station 12 for packing units 13 of undesired properties may be arranged between the receiving station 4 and the storing station 10. The ejecting station 12 includes adjustable guiding elements 14 and 15 and a container 16 for receiving empty packages and a container 17 for receiving, for example, partly filled packages 13 of undesired properties. The ejecting station 12 makes it possible to separate these two different kinds of packages 13 of undesired properties. Nevertheless, this is no essential aspect of the present invention. It is only important that, at any point, either in the region of the conveying device 2 or in front of the receiving station 4, packages 13 of undesired properties are taken off the conveying stream, so that exclusively packing units 3 of desired properties arrive at the stack building station 6.

The design of the receiving station 4 and of the stack building station 6 are not of essential importance to the present invention. The receiving station 4 may include a press with which packing units 3 of desired properties are punched out of a band of a deep drawing packing apparatus in the form of known blister packages for tablets. In the simplest embodiment, the receiving station 4 may include a conveying belt or a conveyor of another design with which packing units 3 are fed into the transfer apparatus 1.

Figure 2:
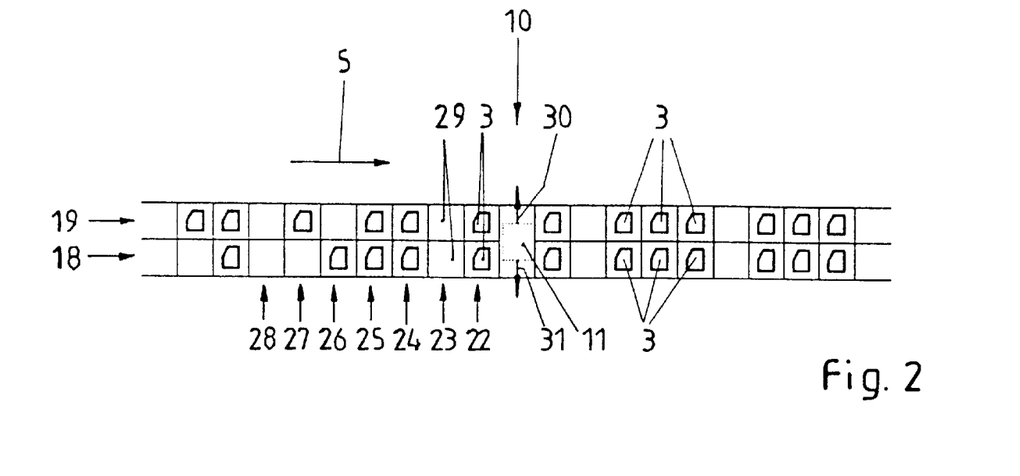
FIG. 2 schematically illustrates the conveying path of the packing units in a transfer apparatus including two tracks.

It is essential to the present invention that the receiving station 4 and the transfer apparatus 1 are designed to include a plurality of tracks. A plurality of tracks means that at least two tracks are provided this means that at least two tracks 18 and 19 (FIG. 2) are arranged side by side. In case of a design including three tracks (FIGS. 3 and 4), there is an additional track 20, and in case of a design including four tracks (FIGS. 5 and 7), there is an additional track 21. FIGS. 2 to 7 serve to render clear that the present invention is applicable to different numbers of tracks. The present invention may be also used with more than four tracks. It is difficult to visualize the plurality of tracks in FIG. 1. For example, the first track 18 may move into the plane of projection of FIG. 1, whereas the second track 19 is arranged in a plane parallel and below the plane of projection. Thus, a receiving station 4 including two tracks includes two packing units 3 at the same position in the conveying stream, the outlines of which cover each other in FIG. 1. In the simplest case, there may be a conveying belt instead of the receiving station 4, two packing units 3 being arranged side by side on the conveying belt and forming a row 22 extending in a direction transverse to the conveying direction 5 (FIG. 2). To better describe different rows in the following, the rows 22 to 28 are indicated by different reference numerals in FIG. 2, as they arrive in a system including two tracks (18 and 19). It can be seen that the row 21 is completely filled with packing units 3 of desired properties. This means that in the row 22 the track 18 and the track 19 each carry a packing unit 3 of desired properties, so that the row 22 is completely filled with packing units 3 of desired properties. To facilitate the illustration of FIG. 2, only packing units 3 of desired properties are illustrated, whereas packages 13 of undesired properties are not illustrated, but instead empty spaces 29 are indicated. Nevertheless, the empty spaces 29 do not really have to mean that there us no packing unit at all. It is also possible that damaged or only partly filled packages 13 are located on the empty spaces 29. It is at least true that by definition no packing unit 3 of desired properties is located in one of the empty spaces 29. The row 23 following the row 22 in the conveying direction 5 includes two empty spaces 29, meaning that there is no packing unit 3 of desired properties on the track 18 and on the track 19 in the row 23. The occurrence of the empty spaces 29 may be based on different reasons. It is possible that, from the start, there has never been a packing unit 3 on the track at the receiving station 4. It is also possible that a package 13 of undesired properties has been ejected from the system, for example by the ejecting station 12. The storing station 10 is only indicated by its storing location 11. Arrows 30 and 31 indicate that the storing location 11 of the storing station 10 is movable in a direction transverse to the conveying direction 5 and perpendicular to the plane of projection of FIG. 1. The storing location 11 never remains in the middle position being illustrated in FIG. 2 during the operation of the storing station 10, but it is rather located according to arrow 30 in alignment to the track 19 or according to arrow 31 in alignment to the track 18.

The rows 22 to 28 and so on move in a clocked manner with respect to the storing station 10. The storing station 10 is not activated in case the rows 22, 24 and 25 being completely filled with packing units 3 of desired properties arrive. These rows 22, 24 and 25 are further conveyed to the stack building station 6 via the storing station 10. The storing station 10 is also not activated in case the row 23 including two empty spaces 29 arrives. The storing station 10 is activated when the row 26 is conveyed by an arm 8 of the conveying device 2. In the row 26, the track 18 is occupied by a packing unit 3 of desired properties, whereas the adjacent track 19 has an empty space 29. In this case, the storing location 11 of the storing station 10 is moved into alignment with the track 18 according to arrow 31. Of course, this movement is only necessary if the storing location 11 is not already located in this position. The packing unit 3 of desired properties is picked up from the track 18 in the row 26, and it is located in the storing location 11 of the storing station 10, so that the row 26 now looks like the row 23 having two empty spaces 29. Such rows being completely empty can be seen at the right side of the storing station 10 in FIG. 2. Finally, they are conveyed to the stack building device 6.

Another possible error is illustrated in the row 27. The track 18 of the row 27 includes an empty space 29, whereas the track 19 of the row 27 includes a packing unit 3 of desired properties. To correct this error, the previously stored packing unit 3 is given from the storing location 11 to the corresponding empty suction element 9 of the rotor 7, so that the row 27 previously not being correctly filled is now filled with packing units 3 of desired properties, as it is for example illustrated in the rows 22, 24 and 25 in FIG. 2. The row including two packing units 3 is complete, and the two packing units 3 of desired properties arrive at the stack building station 6 at the same time. One of the packing units 3 is put in a stack 32, whereas the other packing unit 3 is put into a stack 33 being arranged behind the first stack 32. The stack building station 6 also includes a plurality of tracks, as this has been described with respect to the receiving station 4 and the conveying device 2. It can be seen from the above described arrangement that only one storing location 11 is required at the storing station 10 in case of two tracks. Correspondingly, only one packing unit 3 of desired properties is stored in the storing location 11 at a time. The period of time during which the packing unit 3 is stored is relatively short and it corresponds to how often empty spaces 29 (only one empty space 29 per row) occur.

There is another possible case not being illustrated in FIG. 2 in which two empty spaces 29 are arranged at a certain distance in the same track, for example, the track 18, while the other track 19 is filled with packing units 3 of desired properties in the corresponding rows. In this case, the storing location 11 is moved into alignment to the track 19 according to arrow 30 when the first empty space 29 occurs and in case the storing location 11 is not occupied, so that the storing location 11 receives a packing unit 3 of desired properties to be stored for a period of time. The stored packing unit 3 of desired properties is not required in the track 19, but instead in the track 18 to occupy the next empty space 29. Thus, it is necessary to move the storing location 11 from one track to the other track, namely from the track 19 to the track 18, in a direction transverse to the conveying direction 5 according to arrow 31, so that the storing location 11 is in alignment to the track 18 before the stored packing unit 3 is used to fill up a row. Thus, in case of a two track design of the stack building station 6, the two stacks 32 and 33 (FIG. 1) are either filled up with a packing unit 3 of desired properties at the same time, or no packing units 3 arrive at the stacks 32, 33 in one row. Thus, it is ensured that each stack 32 and 33 includes the same number of packing units 3 of desired properties at each time. The stacks 32 and 33 grow at the same speed, and they include the same number of packing units 3 at the same time. The number of packing units 3 of desired properties in the stacks 32 and 33 can be chosen, and it can be adjusted to the desired number, respectively. A complete stack may, for example, include 2 to 10 packing units 3, for example, in the form of blister packages.

As schematically illustrated in FIG. 1, there is a device 34 for detecting an empty space 29 in the tracks 18, 19 and so forth, an observing device 35 for detecting if the storing location 11 of the storing station 10 is occupied or empty, a processor 36 or a computer for calculating if the number of stored packing units 3 is sufficient to form a complete row of packing units 3, and a control device 37 for controlling the movements of the storing station 10, the conveying device 2 and the stack building station 6 with respect to one another. In case suction elements 9 are used at the arms 8 of the rotor 7, it is clear that a source of negative pressure and corresponding control valves and conduits are arranged to selectively take in packing units 3 of desired properties and/or packages 13 of undesired properties. The packing units 3 and/or the packages 13 are conveyed and released. The device 34 and the observing device 35 may also be connected to be one unit. The processor 36 may be also part of this unit. There is a great number of possible variations for forming such a unit.

It can be also seen from FIG. 1 that the rotor 7 only includes three arms 8 being positionable with their suction elements 9 in four different positions about the circumference. One of the position is allocated to the receiving station 4, the second position is allocated to the storing station 10 and the third relative position is allocated to the stack building station 6. An extra supply unit 48 is located at the fourth position. Packing units 3 of desired properties can be manually inserted into the system by the extra supply unit 38. Nevertheless, it is not necessary to provide an extra supply that 38. If an extra supply unit 38 is used, only one extra supply unit 38 is used, although the transfer apparatus 1 includes a plurality of tracks. The processing of a stack of manually inserted packing units 3 of desired properties in the extra supply unit 38 may, for example, be actuated at the end of a charge. In this case, the storing station 10 is used for the change of tracks. For example, if no packing units 3 arrive at the receiving station 4 any more, and there still is a supply of packing units 3 at the extra supply unit 38 to be processed, a complete row and an empty row arrive alternatingly at the stack building station 6, so that a conveying device working together with the stack building station 6 only allows for the stacks to be lowered every other cycle, until the stacks 32 and 33 are completely filled. Then, a case chain (only schematically illustrated) switches the two complete stacks 32 and 33 to the next cycle.

Figure 3:
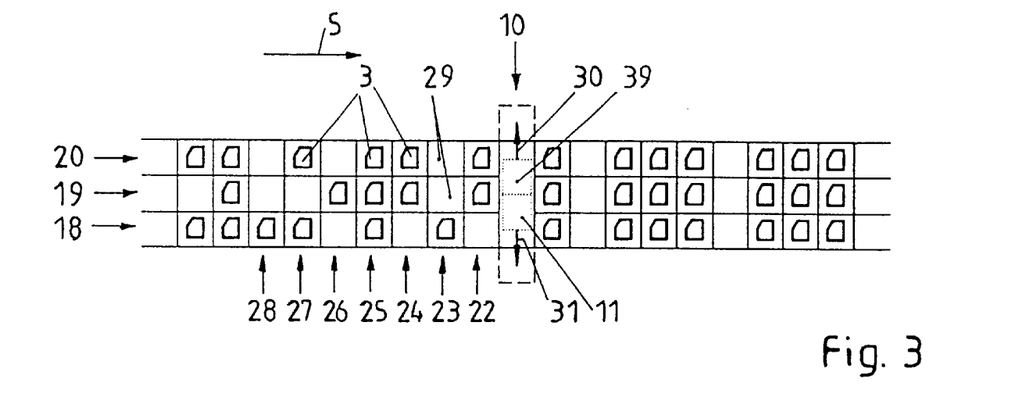
FIG. 3 schematically illustrates the conveying path of the packing units in a transfer apparatus including three tracks.
Figure 4:
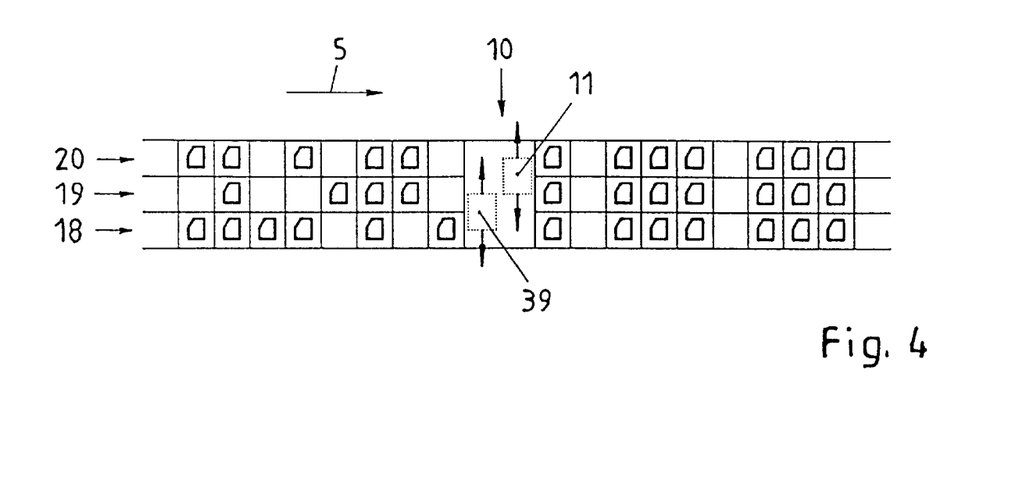
FIG. 4 illustrates another exemplary arrangement of the storing station in a transfer apparatus including three tracks.

FIGS. 3 and 4 illustrate two embodiments including three tracks. The tracks 18, 19 and 20 are arranged adjacent to one another. Again, packing units 3 of desired properties and empty spaces 29 are illustrated. In case of a three track design, the storing station 10 includes two storing locations. Thus, a storing location 39 is arranged in addition to the storing location 11. In the embodiment according to FIG. 3, both storing locations 11 and 39 are arranged in the same plane transverse to the conveying direction 5. Both storing locations 11 and 39 are independently movable, so that each storing location 11 and 39, respectively, can be brought into alignment with the tracks 18, 19, 20 independently. But it is also possible that both storing locations 11 and 39 are brought into alignment with only one of the tracks 18, 19, 20 at the same time. Nevertheless, it is not necessary to have such an arrangement.

According to FIG. 3, both storing locations 11 and 39 are empty when the row 22 is to be processed. The row 22 only includes an empty space 29 in the track 18, while the tracks 19 and 20 include packing units 3 of desired properties. In this case, it is necessary to move the storing location 11 into alignment to the track 19, and to move the storing location 39 into alignment to the track 20. Thus, both storing locations 11, 39 are moved according to arrow 30. The two packing units 3 of desired properties on the tracks 19 and 20 are stored, so that the row 22 does not include any packing units 3 any more, as it is desired. Then, the next row 23 is to be processed, and the device 34 and the observing device 35 have detected and the processor 36 has calculated that the two stored packing units 3 are sufficient to complete the row 23. A lateral movement and changing of the tracks are not necessary. The two stored packing units 3 of desired properties are inserted into the system at the empty spaces 29 in the row 23, so that a complete row 23 is achieved. Accordingly, each of the three packing units 3 is put in a different stack at the stack building station 6. Thus, the storing locations 11 and 39 are empty again, and the row 24 approaches, the row 24 only including one empty space 29 in the track 18. This means that the two packing units 3 of desired properties of the row 24 are stored on the storing locations 11 and 39. The following row 25 is completely filled, so that it is not necessary to actuate the storing station 10. The three packing units 3 of desired properties of the row 25 pass through the storing station 10, and they arrive at the stack building station 6 at the same time without being influenced by the storing station 10. Next, the row 26 approaches, the row 26 only including one packing unit 3 of desired properties in the row 19. The storing location 39 is already in alignment to the track 20. The storing location 11 with the stored packing unit 3 of desired properties is brought into alignment to the track 18 coming from the track 18 and changing tracks, and the two packing units 3 are passed to the corresponding suction elements 9 at the same time, so that the row 26 is completely filled. This operation is correspondingly repeated. Thus, only complete rows of packing units 3 of desired properties or completely empty rows are present after the storing station 10 in the conveying direction 5, as it is for example illustrated in FIG. 3. This ensures that the stacks at the stack building station 6 grow uniformly.

FIG. 4 also illustrates a three track design system including the tracks 18, 19 and 20. The two storing locations 11 and 39 are arranged in two planes transverse to the conveying direction 5. Such an arrangement is advantageous to freely move the tracks. On the other hand, two separate storing station 10 have to be arranged about the circumference of the rotor 7 if no special proceedings are taken to only require one storing station 10, as this is indicated in FIG. 3. The operation corresponds to the above described operation.

Figure 5:
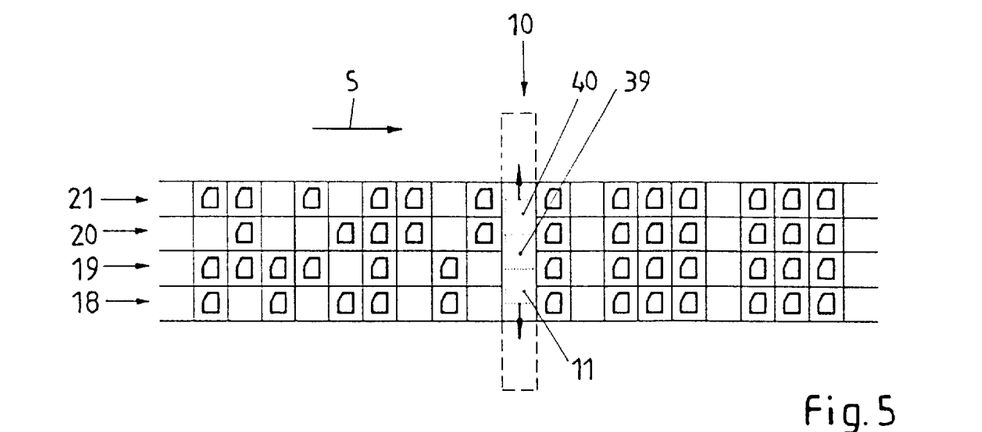
FIG. 5 illustrates a first embodiment of a transfer apparatus including four tracks.
Figure 6:
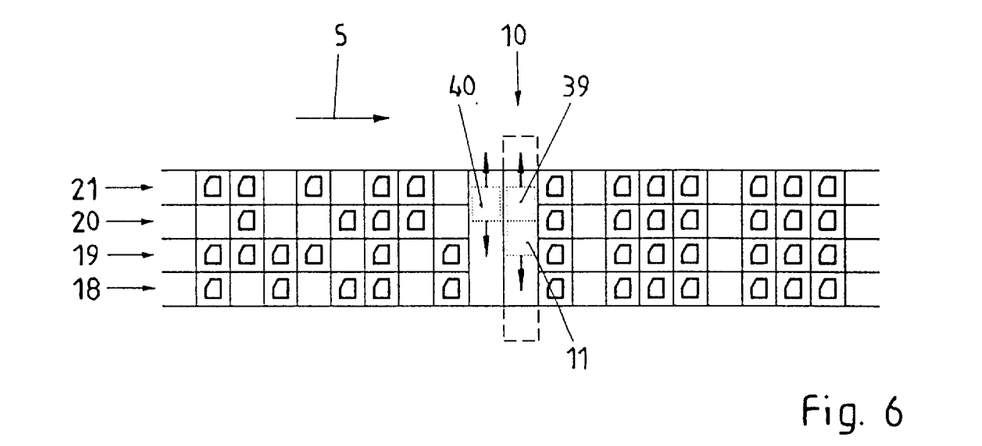
FIG. 6 illustrates a second embodiment of a storing device in a transfer apparatus including four tracks.
Figure 7:
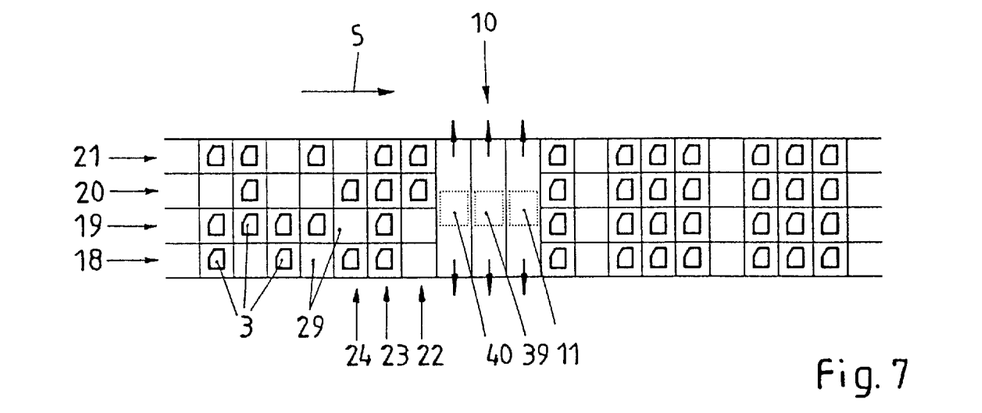
FIG. 7 illustrates a third embodiment of the storing device in a transfer apparatus including four tracks.

FIGS. 5, 6 and 7 each illustrate systems including four tracks 18, 19, 20 and 21. In this case, there is a third storing location 40. The different embodiments of the FIGS. 5, 6, 7 are based on the two track or three track embodiments of FIGS. 2 to 4. Without any problems embodiments including 5, 6 or more tracks are possible. The more tracks the system includes, the more complicated it gets. It is obvious that the number of required storing locations is less than the number of tracks by 1. The maximum number of packing units 3 being stored in the storing locations is always less than the number of tracks by 1. With this arrangement, on the one hand, it is possible to store a low number of packing units 3, and, on the other hand, to minimize the period of time in which the packing units 3 are stored.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of transferring packing units from a receiving station to a stack building station, said method comprising the steps of:

delivering the packing units to the receiving station in a plurality of rows and in a plurality of tracks in a conveying direction;

accepting the packing units in a plurality of rows and in a plurality of tracks at a transfer apparatus;

removing all packing units of desired properties from a first row not only including packing units of desired properties;

storing the removed packing units of desired properties; and positioning at least one of the stored packing units of desired properties in an incomplete row following the first row to complete the incomplete row, so that only rows of packing units of desired properties are collected at the stack building station.

2. The method of claim 1, further comprising the step of removing a packing unit of undesired properties from the first row prior to removing all packing units of desired properties from the first row not only including packing units of desired properties.

3. The method of claim 1, wherein in case of at least two following rows not only including packing units of desired properties in a first track, the stored packing unit of desired properties coming from a second track and from the first row of rows not only including packing units of desired properties is moved transverse to the conveying direction to the first track and to the second row to form a complete second row.

4. The method of claim 1, wherein in case of delivering the packing units to the receiving station in two tracks of packing units, only one packing unit of desired properties is stored, and in case of a row not only including packing units of desired properties, the stored packing unit of desired properties is fed into the row not only including packing units of desired properties to form a complete row including two packing units of desired properties.

5. The method of claim 1, wherein in case of delivering the packing units to the receiving station in at least three tracks of packing units, at least one packing unit of desired properties is stored, and in case of a row not only including packing units of desired properties, the at least one stored packing unit of desired properties is either fed into the row not only including packing units of desired properties to form a complete row including at least three packing units of desired properties or, if it is not possible to form a complete row, the at least one packing unit of desired properties in the row not only including packing units of desired properties is stored to form an empty row.

6. A method of transferring packing units from a receiving station to a stack building station comprising the steps of:

(a) conveying the packing units to the receiving station in a plurality rows and a plurality of tracks, at least some of the rows containing packing units of desired properties and packing units of undesired properties;

(b) removing packing units of desired properties from a first row containing packing units of desired properties and packing units of undesired properties;

(c) storing the removed packing units of desired properties;

(e) placing at least one of the stored packing units of desired properties in a vacant track of a row following the first row to complete the row following the first row with only packing units of desired properties; and (f) repeating steps (b) through (e) for subsequent rows such that complete rows containing only packing units of desired properties are formed for transfer to the stack building station.

7. The method of claim 6 and further comprising the step of removing packing units of undesired properties from the first row prior to step (b).

8. The method of claim 6 and wherein step (e) further comprises moving the at least one of the stored packing units transverse to the conveying direction prior to placing it in a vacant track of a row following the first row, the packing unit thereby being placed in a track different than the track from which it was removed.

9. For implementation in a packing machine wherein articles are conveyed in rows along a path, at least some of the rows not being completely filled with acceptable articles, a method of filling rows with only acceptable articles for delivery to a packing station, said method comprising the steps of removing the acceptable articles from a first row that is not completely filled with acceptable articles, temporarily storing the removed acceptable articles, placing stored acceptable articles in vacant positions of a subsequent row to complete the subsequent row with only acceptable articles, repeating the previous steps to form rows containing only acceptable articles, and conveying the rows containing only acceptable articles to a packing station for packing.

* * * * *

UNITED STATES PATENT AND TRADEMARK OFFICE
CERTIFICATE OF CORRECTION

| | |
|---|---|
| PATENT NO. | : 6,347,709 B1 |
| DATED | : February 19, 2002 |
| INVENTOR(S) | : Johann Biehl, Dieter Gaus, Horst Kaplan, Eugen Niessner and Jorg Knuppel |

It is certified that error appears in the above-identified patent and that said Letters Patent is hereby corrected as shown below:

<u>Title page,</u>
Item [73], Assignee, delete "Kloeckner Medipak GmbH" and insert
-- Klockner Medipak GmbH --.

Signed and Sealed this

Seventeenth Day of September, 2002

*Attest:*

JAMES E. ROGAN
*Attesting Officer*        *Director of the United States Patent and Trademark Office*